United States Patent

Moore et al.

[15] 3,700,260
[45] Oct. 24, 1972

[54] MUD FLAP AND MOUNTING MEANS

[72] Inventors: Peter N. Moore; Leo F. Pierce, both of 117 S.W. 23, Oklahoma City, Okla. 73109

[22] Filed: Feb. 19, 1971

[21] Appl. No.: 116,775

Related U.S. Application Data

[63] Continuation-in-part of Ser. No. 858,078, Sept. 15, 1969, abandoned.

[52] U.S. Cl. ............................................280/154.5 R
[51] Int. Cl. ............................................B62d 25/18
[58] Field of Search ...............................280/154.5 R

[56] References Cited

UNITED STATES PATENTS

| | | |
|---|---|---|
| 3,219,363 | 11/1965 | Dalsey ................280/154.5 R |
| 3,158,386 | 11/1964 | Tillingshast.........280/154.5 R |
| 3,285,624 | 11/1966 | Aber.....................280/154.5 R |
| 2,777,710 | 1/1957 | Panchesine..........280/154.5 R |

Primary Examiner—Benjamin Hersh
Assistant Examiner—Robert R. Song
Attorney—Robert K. Rhea

[57] ABSTRACT

Spring urged clamp means, connected with a vehicle rearward support, grips an enlarged upper edge portion of a mud flap. Downwardly directed stress impressed on the depending portion of the mud flap opens the clamp means to release the mud flap.

6 Claims, 7 Drawing Figures

PATENTED OCT 24 1972
3,700,260
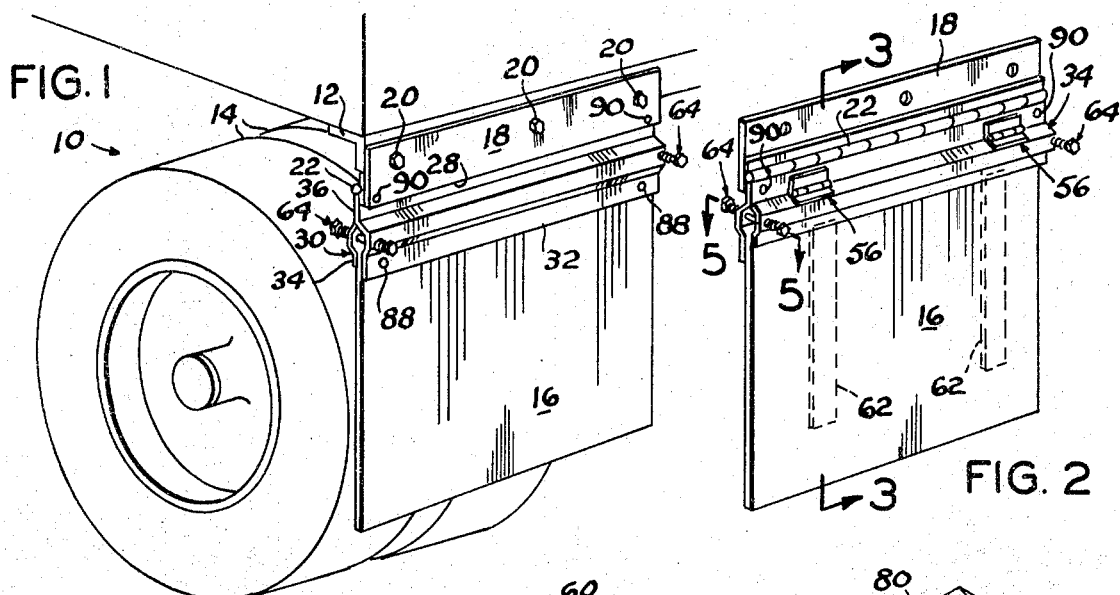
FIG.1
FIG.2
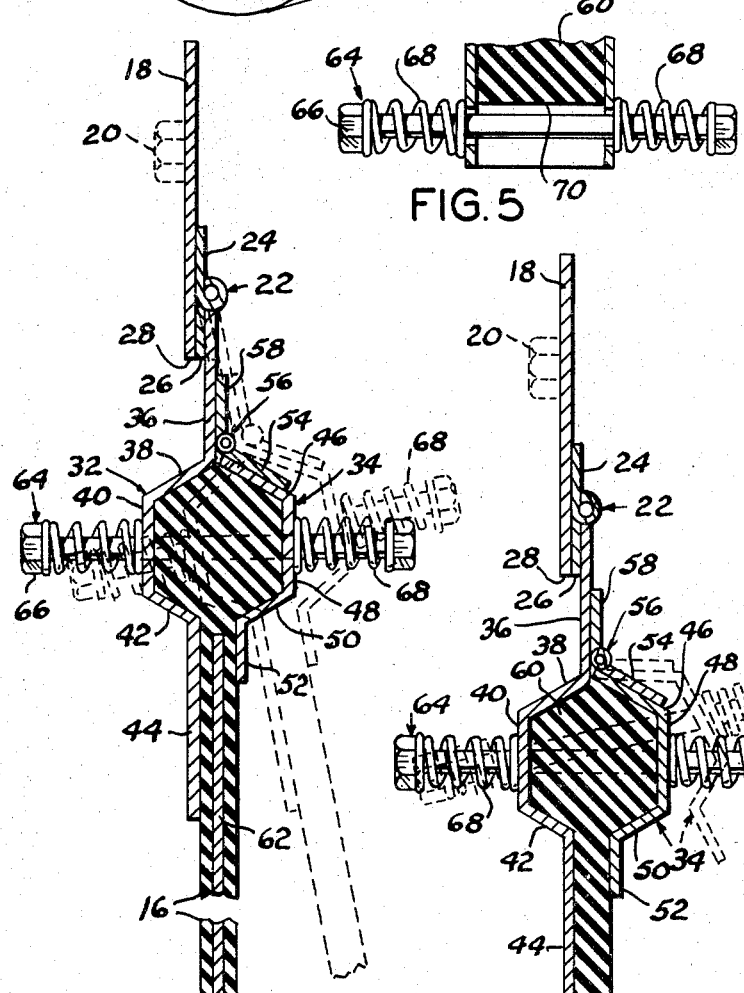
FIG.3
FIG.4
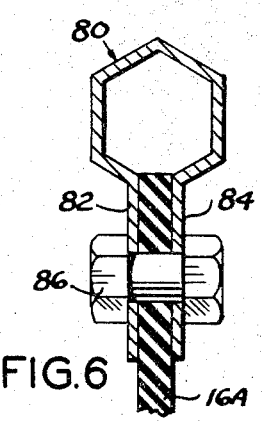
FIG.5
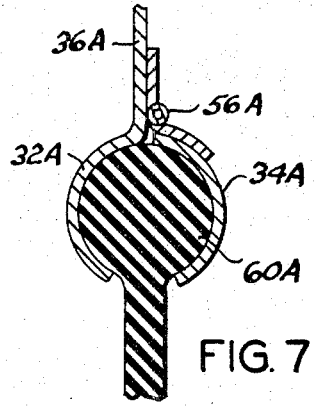
FIG.6
FIG.7
PETER N. MOORE
LEO F. PIERCE
INVENTORS.
BY
Robert K. Rhea
AGENT

3,700,260

MUD FLAP AND MOUNTING MEANS

CROSS REFERENCE TO RELATED APPLICATION

The present invention is a continuation-in-part of an application filed by us in the United States Patent Office on Sept. 15, 1969, Ser. No. 858,078 for Stress Released Mud Flap, now abandoned.

BACKGROUND OF THE INVENTION

1. Field of the Invention

The present invention relates to mud flaps for trucks and more particularly to a mounting means releasably connecting the mud flap to the truck.

The principal distinction between this invention and the device disclosed by the above referred to application is the manner of mounting the mud flap holding clamp means to the truck connected base plate permitting forward pivoting movement, about a horizontal axis, of the mud flap and clamp means toward the vehicle wheels, as opposed to a fixed position or rigid mounting, and yet hampering rearward movement of the mud flap during forward movement of the vehicle commonly referred to as "sailing." This invention is further distinctive over the above referred to application by the manner of connecting the mud flap gripping or clamp jaws together.

In most states it is a requirement that trucks be provided with mud flaps which are mounted in vertical depending position rearwardly of the rear wheels of trucks and trailers. This is primarily a safety requirement so that muddy water, rocks, and the like, picked up by the wheels of the truck or trailer impinge on the mud flap. Under certain conditions of normal operation these mud flaps are damaged and in some instances torn away necessitating their replacement. This frequently happens by the truck or trailer being backed to position it at a loading dock wherein the rear wheels impinge the mud flap against a fixed support so that the mud flap is torn or damaged and in some instances torn away from its support on the vehicle. Mud flaps are normally bolted to a support on the vehicle and are not easily replaced by the driver while making a trip.

2. Description of the Prior Art

The most pertinent patents of which we are aware are the ones to Tillinghast et al., U.S. Pat. No. 3,158,386 and Dalsey et al., U.S. Pat. No. 3,219,363. The mud flap clamp means of each of these patents is intended to be used with a mud flap formed for cooperation with the particular clamp means.

This invention, on the other hand, provides a mounting means for modification of existing mud flaps for releasable mounting so that they may be easily repositioned each time they are pulled off of the truck wherein only the addition of one embodiment of our clamp means is required for the modification. Furthermore, our clamp means permits using mud flaps which have previously been torn away from their original mounting by simply cutting off the damaged edge portion and connecting the used mud flap to our clamping means.

SUMMARY OF THE INVENTION

A mounting or base plate is vertically secured to a rearward transverse support of the vehicle rearwardly of the rear wheel position. A hinge is transversely secured to the depending edge portion of the mounting plate. One jaw of a clamp means is secured to a depending flap or leaf of the hinge. The other jaw of the clamp means is hingedly connected to the first main jaw and is normally urged toward the first named jaw in a cooperating closed position by spring and bolt means. A mud flap thickened edge portion, formed on or secured to one side edge portion of a mud flap, forms a lug removably gripped by the clamp means.

The principal object of this invention is to provide an apparatus for connecting mud flaps to trucks which will release the mud flap in a replaceable break-away fashion when the mud flap is under stress.

BRIEF DESCRIPTION OF THE DRAWINGS

FIG. 1 is a fragmentary perspective view of a trailer having the device installed thereon;

FIG. 2 is a perspective view of the device, per se, rotated substantially 180° about a vertical axis from its position in FIG. 1;

FIG. 3 is a fragmentary vertical cross-sectional view, to a larger scale, taken substantially along the line 3—3 of FIG. 2 and illustrating, by dotted lines, a forward pivoting movement of the mud flap and clamp means about the horizontal axis of its base plate hinge mounting;

FIG. 4 is a fragmentary vertical cross-sectional view similar to FIG. 3 and illustrating, by dotted lines, the position of the movable jaw of the clamp means when releasing or installing a mud flap;

FIG. 5 is a fragmentary horizontal cross-sectional view, partially in elevation, taken substantially along the line 5—5 of FIG. 2;

FIG. 6 is a fragmentary vertical cross-sectional view illustrating an alternative manner of forming a lug on one edge portion of a mud flap; and, FIG. 7 is a fragmentary vertical cross-sectional view illustrating an alternative configuration of the mud flap attached lug and mud flap holding clamp means.

DESCRIPTION OF THE PREFERRED EMBODIMENTS

Like characters of reference designate like parts in those figures of the drawings in which they occur.

In the drawings:

The reference numeral 10 indicates the rearward end portion of a trailer having a horizontal support 12 positioned above and rearwardly of wheels 14 to which a mud flap 16 is normally connected in depending relation. The numeral 18 indicates a rectangular base plate which is secured to the support 12 by bolts 20. The base plate 18 depends vertically from the support 12 a selected distance. Hinge means, such as a piano hinge 22, having oppositely directed hinge leaves 24 and 26 has its hinge leaf 24 secured to the forward surface of the base plate 18 by any suitable means, such as spot welding, not shown, adjacent its depending edge 28. Obviously other type hinge means may be used, if desired. The distance between the longitudinal axis of the hinge pin of the piano hinge 22 and the depending edge 28 of the base plate is preferably at least as great as the transverse width of the other hinge leaf 26 as clearly illustrated in FIGS. 1 and 3.

A mud flap clamp means 30 is secured to the depending hinge leaf 26. The clamp means 30 is substantially hexagonal in cross section comprising a support jaw 32 and a movable jaw 34. The support jaw 32 is preferably formed from a rectangular section of sheet metal having a length substantially equal to the base plate 28 and a selected transverse dimension. One longitudinal edge portion of the support jaw 32 is similarly connected to the depending piano hinge leaf 26 on its surface opposite the base plate 18. Medially its width, the support jaw 32 is deformed to extend rearwardly and downwardly from the plane of its upper leg portion 36, as at 38, then downwardly as at 40, parallel with respect to the vertical plane of its leg 36, then angularly downwardly and forwardly, as at 42, toward the plane of its upper leg 36, terminating in a lower leg portion 44 of a selected vertical height parallel with respect to the plane of its upper leg 36, for the purposes presently described, thus forming substantially one-half of the hexagonal cross section of the configuration of the clamp means. The base plate 18 and support jaw 32 may be formed as a unitary rigid support thus eliminating the forward pivoting feature of the mud flap.

The other or movable jaw 34 of the clamp means comprises an upper rearwardly and upwardly inclined section 46, an intermediate vertical portion 48 and a lower rearwardly and downwardly inclined section 50 terminating in a depending leg portion 52 in forward parallel spaced relation with respect to the depending leg portion 44 of the support jaw 32 thus defining the other or forward substantially one-half portion of the hexagonal shape of the clamp means. The upwardly inclined and rearwardly directed section 46 of the movable clamp 34 is similarly secured to one leaf 54 of one or more strap hinges 56 with the other leaf 58 of the strap hinge flatly secured to the forward vertical surface of the support jaw leg 36 permitting vertical pivoting movement about a horizontal axis of the movable clamp jaw 34 toward and away from the support jaw 32.

The mud flap 16 comprises a rectangular section of flexible material, preferably formed of reinforced rubber, or the like, as is conventional with presently used mud flaps. The width of the mud flap is substantially equal to the length of the clamp means 30 and has one marginal edge portion integrally joined to a lug 60 formed thereon. The lug 60 is preferably hexagonal in cross section and dimensioned for cooperative reception by the clamp means between its jaws 32 and 34. The mud flap is further characterized by one or more, two in the example shown, stiffeners 62 impinged within the mud flap between its forward and rearward surfaces. The stiffeners 62 comprise a strap-like section of metallic material having a desired width with one end portion disposed adjacent the lower limit of the mud flap lug 60 and terminating at its other depending end in spaced relation with respect to the depending edge of the mud flap. The depending leg 44 of the clamp jaw 32 projects downwardly beyond the upper limit of the stiffeners 62 and cooperates with the latter in preventing a rearward sailing action of the mud flap as a result of wind resistance against the mud flap during forward movement of the truck. Similarly the upper leg 36, of the support clamp jaw 32 being connected with the piano hinge leaf 26, is biased by wind resistance on the mud flap into contact with the depending edge portion of the base support plate 18 to resist rearward movement of the clamp means during forward movement of the truck.

The jaws of the clamp means 30 is maintained in gripping relation with respect to the mud flap lug 60 by resilient means 64. The resilient means 64 comprises a bolt 66 which extends horizontally through suitable apertures cooperatively formed in respective opposing end portions of the clamp jaws 32 and 34 medially the vertical sections 40 and 48. A pair of helical springs 68 surround the respective end portions of the bolt 66 projecting beyond the clamp jaws and normally biases the movable clamp jaw 34 toward the support jaw 32 in mud flap lug clamping relation.

As shown more clearly in FIG. 5, a portion of each end of the mud flap lug 60 is cut off, as indicated by the line 70, so that the respective ends of the mud flap lug 60 terminate short of the position of the bolts 66 for the purpose of releasing the mud flap as described hereinbelow.

Alternatively the mud flap 16 may be dimensioned so that its transverse width is slightly less than the horizontal spacing between the bolts 66.

FIG. 6 illustrates the manner of connecting a substantially conventional mud flap 16A to the clamp means 30 which comprises a substantially hexagonal shaped member 80. The member 80 is formed from a length of sheet metal coextensive with one edge of the mud flap 16A and is deformed medially its width to substantially describe, in transverse cross section, the hexagonal shaped member 80 terminating at its respective marginal edges in parallel leg members 82 and 84 which are line drilled for receiving a bolt and nut 86 extending through a suitable aperture formed in the mud flap 16A. The hexagonal portion of the member 80 is dimensioned for cooperative reception between clamp jaws 32 and 34.

Alternatively the substantially conventional mud flap 16A may be bolted to the clamp support jaw leg 44 through apertures 88 formed in its depending edge portion (FIG. 1).

FIG. 7 illustrates a further embodiment wherein the clamp jaws 32A and 34A substantially describe a circular configuration, in transverse cross section, for cooperatively receiving a circular lug 60A formed on one edge of the mud flap. In this embodiment the movable clamp jaw 34A is similarly connected by strap hinges 56A to the support jaw leg 36A.

OPERATION

In operation the base plate 18, having the clamp means 30 connected therewith, is connected to the support 12 as described hereinabove. The mud flap lug 60 is positioned between the jaws of the clamp means 30 and the resilient means 64 is installed, as described hereinabove, for gripping the lug 60. When the truck is backed toward a receiving dock, or the like, not shown, and the mud flap contacts a vertical edge portion of the dock, the mud flap and clamp means 30 may move toward the wheels 14 and the forward end of the truck by pivoting movement about the horizontal axis formed by the pin of the piano hinge 22. If the forward pivoting movement of the flap is undesirable, bolts not shown, may be placed in cooperating bores 90 (FIGS. 1 and 2) formed through the base plate 18, piano hinge leaf 26 and support clamp leg 36. In the event this forward pivoting movement of the mud flap does not compensate for the rearward movement of the wheels toward the loading dock and the wheels impinge the mud flap between a portion of their periphery and the wall of the dock a downwardly directed stress imparted to the mud flap pulls the mud flap lug 60 out of the clamp means 30 wherein the movable clamp jaw 34 pivots about the horizontal axis formed by the pins of the strap hinges 56 to substantially the position of the jaw 34 shown by dotted lines (FIG. 4). This action releases the mud flap 16 without damage thereto. The driver may thereafter replace the released mud flap in the manner described hereinabove or alternatively manually move the movable clamp jaw 34 to its dotted line position of FIG. 4 for repositioning the lug 60 between the jaws of the clamp means.

Operation of the alternative embodiments illustrated in FIGS. 6 and 7 is substantially identical to the preferred embodiment.

A further embodiment, which we have found satisfactory and reduces the cost of manufacture, is the elimination of the strap hinge means 56 wherein the resilient action of the spring 68 maintains the jaws of the clamp means in closed gripping relation with respect to the mud flap lug 60.

Obviously the invention is susceptible to changes or alterations without defeating its practicability, therefore, we do not wish to be confined to the preferred embodiment shown in the drawings and described herein.

We claim:

1. A vehicle mud flap support and holder, comprising:

a base plate adapted to be transversely secured to a vehicle surface rearwardly of the wheel position,
   said base plate having a depending portion turned laterally rearward, downwardly and forwardly with its depending edge terminating rearwardly of the plane of said base plate forming a fixed clamp jaw;
   a movable clamp jaw positioned on said base plate for cooperative movement toward and away from said fixed clamp jaw,
   said movable clamp jaw extending laterally forward and downwardly from and rearwardly toward said fixed clamp jaw with its depending edge terminating forwardly of the plane of said base plate;
   a generally rectangular mud flap;
   a lug secured to and substantially coextensive with one side edge of said mud flap,
   said lug projecting laterally of the planes of opposing surfaces of said mud flap,
   said lug being cooperatively received between said clamp jaws; and,
   spring means connected with each said clamp jaw at their respective end portions.

2. The support and holder according to claim 1 in which said spring means includes:

a bolt extending through the respective end portions of said jaws and projecting beyond the respective lateral limit of said jaws; and,
   a tension spring supported by the respective end portion of said bolts and normally biasing said movable clamp jaw toward said fixed clamp jaw.

3. The support and holder according to claim 1 in which said base plate is transversely divided intermediate its connection with said vehicle and the upper limit of said fixed clamp jaw and further including:

a piano hinge connecting said fixed clamp jaw to the forward surface of said base plate above the depending edge of the latter.

4. The support and holder according to claim 3 and further including:

strap hinges connecting said movable clamp jaw to said fixed clamp jaw.

5. The support and holder according to claim 1 and further including:

strap hinges connecting said movable clamp jaw to said fixed clamp jaw.

6. The support and holder according to claim 1 in which said clamp jaws form a polygonal-shape in cross section and in which said lug comprises a section of metal doubled back upon itself to form a cooperating polygonal-shape and defining laterally projecting spaced-apart parallel leg portions cooperatively contacting opposing surfaces of said mud flap; and, bolt means connecting said leg portions to said mud flap.

* * * * *